Jan. 26, 1960 H. FISCHER ET AL 2,922,350
ATTACHMENT FOR STEREOSCOPIC CAMERA
Filed June 20, 1957 5 Sheets-Sheet 1

INVENTOR.
Helmut Fischer,
Herbert Ziegler

Jan. 26, 1960   H. FISCHER ET AL   2,922,350
ATTACHMENT FOR STEREOSCOPIC CAMERA
Filed June 20, 1957   5 Sheets-Sheet 2

INVENTOR.
Helmut Fischer
Herbert Ziegler

Jan. 26, 1960  H. FISCHER ET AL  2,922,350
ATTACHMENT FOR STEREOSCOPIC CAMERA
Filed June 20, 1957  5 Sheets-Sheet 3

INVENTOR.
Helmut Fischer,
Herbert Ziegler

Jan. 26, 1960

H. FISCHER ET AL 2,922,350

ATTACHMENT FOR STEREOSCOPIC CAMERA

Filed June 20, 1957

INVENTOR.
Helmut Fischer
Herbert Ziegler

Jan. 26, 1960  H. FISCHER ET AL  2,922,350
ATTACHMENT FOR STEREOSCOPIC CAMERA
Filed June 20, 1957  5 Sheets-Sheet 5

INVENTOR.
Helmut Fischer
Herbert Ziegler

United States Patent Office 2,922,350
Patented Jan. 26, 1960

2,922,350
ATTACHMENT FOR STEREOSCOPIC CAMERA

Helmut Fischer and Herbert Ziegler, Dresden, Germany, assignors to VEB Kamera-Werke Niedersedlitz, Dresden, Germany Application June 20, 1957, Serial No. 666,959

Claims priority, application Germany December 6, 1956

2 Claims. (Cl. 95—18)

This invention relates to stereoscopic cameras of the miniature type having two lenses carried in a lens mount and more particularly to a detachable adaptor for altering the interpupillary distance of the camera.

Heretofore, in order to increase or decrease the interpupillary distance of a stereoscopic camera various types of adaptors utilizing either reflectors or prisms, have been arranged either in the interior or on the exterior of the camera casing.

In those cameras in which the reflectors or prisms are located in the interior of the camera casing the camera must of necessity be increased in size to accommodate the complex mechanism and operating devices which must be accessible from the exterior for operating the reflectors or prisms whereby the latter are effective to deflect the light rays. This increase in the size of the camera renders it more bulky and accordingly more difficult to handle and also increases the manufacturing cost thereof. Furthermore these interior encased adaptors preclude the use of other types of accessory lenses.

While the mounting of light ray deflecting members, such as prisms, on the exterior of the casing does not require that the camera casing be structurally modified, heretofore, these exteriorly mounted prisms or reflectors have been arranged to be turnably or pivotally mounted on the camera such that the light ray deflecting members were capable of achieving a plurality of different interpupillary distances. However, this prior structure required that the prisms be unduly large in order that the latter in their various positions be capable of scanning the entire object to be photographed. These prior prisms, arrangements are usually fixedly fastened directly on the lens mount such that they not only rendered the camera more bulky but also applied, because of the weight of the prisms, a cantilever force on the lens mount tending to strip the threads fastening the lens mounting to the camera casing.

It has also been proposed to provide exteriorly mounted devices for altering the inter-pupillary distance of a stereoscopic camera of the type having the two lenses mounted in common lens mount with a fixed interpupillary distance. In this prior structure the light ray deflecting prisms are carried in a unitary mounting member which is fastened to the camera by pins or screws. However, this arrangement is so constructed as to permit only a decrease in the inter-pupillary adjustment and not an increase as is generally desirable. Furthermore this adaptor is attached to the camera in such a manner as to prevent the use of attachment devices for the camera lens.

It is, accordingly, an object of the present invention to provide an adaptor for varying the inter-pupillary distance of the camera, which adaptor is constructed and arranged such that it will not interfere with the replacement or attachment of camera lens accessories, as for example lenses of different focal lengths, color filters, or field of view adaptors etc., on the lens mount.

The adaptor of the present invention comprises essentially an attachment formed of optical members including a plurality of cooperating light reflecting and light absorbing members, which members are adjustably positionable on a carrier slidably supported on a supporting bracket adapted to be detachably secured to the casing of the stereoscopic camera. The light reflecting members are mounted in two housings supported in spaced relationship on the carrier such that they direct the light rays to the two lenses. The light absorbing member is in the form of a filter disposed therebetween. The two housings are adjustably positionable on the carrier relatively to the two camera lenses and the filter plate is operatively connected to the two housings such that in one of the adjusted positions of the two housings it is operative to diminish the light intensity in front of one of the lenses.

It is a further object of the invention to provide means for correlating the light ray reflecting members and the filter members such that in the operative position of the latter it is held in a locked position.

It is a further object to provide an inter-pupillary distance adaptor which is constructed and arranged to permit the attachment of lens accessories, such as, filters, field and view adaptors, on the camera lens mount.

Another object is to provide a novel means for associating the light ray reflecting carrier in a predetermined operative relationship with the lens mount.

Still another object of the invention is to provide a means for adjusting the carrier toward and away from the lens mount.

A feature of the present invention is the provision on the attachment bracket of a means for accommodating a fastening member adapted to be threaded in the usual tapped opening in the base of the camera and the provision of a tapped opening in the bracket for mounting the camera and the attached adaptor on a tripod or the like.

Further objects and features will hereinafter appear.

Figure 1:
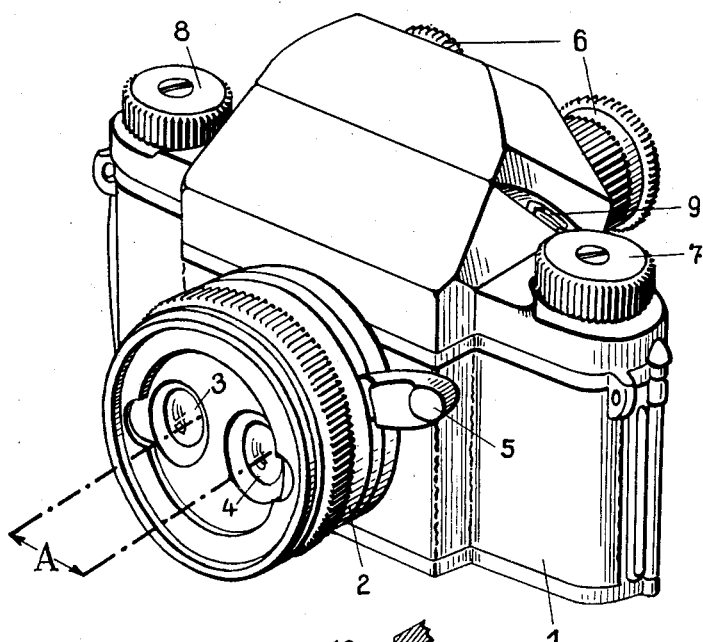
Fig. 1 is a perspective view of a stereoscopic camera to which the adapter of the present invention is adapted to be attached and showing the lens mount in which there is housed the two lenses for creating a stereoscopic photograph having an inter-pupillary distance A.

Referring now to the drawing, Figs. 1 to 4 disclose a stereoscopic camera comprising a lens mount 2 in which there are mounted two lenses 3 and 4 which have, as shown in Fig. 1, a normal inter-pupillary distance A. This inter-pupillary distance A produces an excellent relief and thereby a good quality stereoscopic reproduction when the objects are relatively close. However, as the distance from the object to the camera increases the relief becomes less pronounced and the quality of the reproduction diminishes. The focusing of the lenses 3 and 4 is accomplished in the usual manner by adjusting the latter into alignment to the desired focal length and to this end there is provided a hand lever 5. Incorporated in the stereoscopic camera is a pair of magnifying view finders 6 of conventional construction. The film transporting and film winding is accomplished, respectively, in usual manner, by means of turning knobs 7 and 8. As shown in Fig. 1 the illustrated stereoscopic camera per se does not form a part of the present invention and a further description of its structure is not believed to be necessary.

Figure 2:
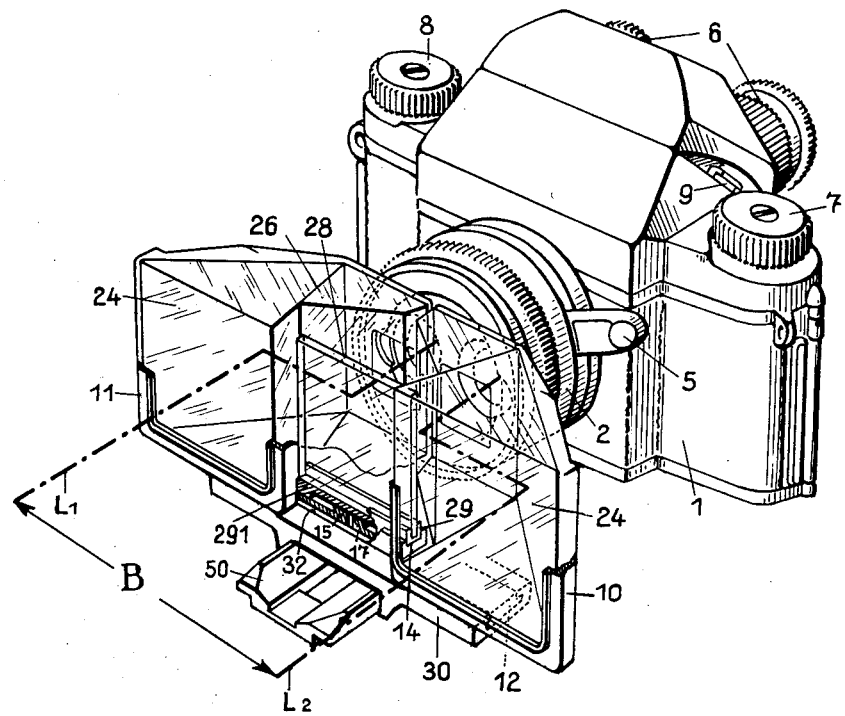
Fig. 2 is a perspective view of the stereoscopic camera shown in Fig. 1 and embodying the adaptor including the carrier and mounting bracket, the adaptor being arranged to achieve an inter-pupillary distance B wider than the inter-pupillary distance A.
Figure 4:
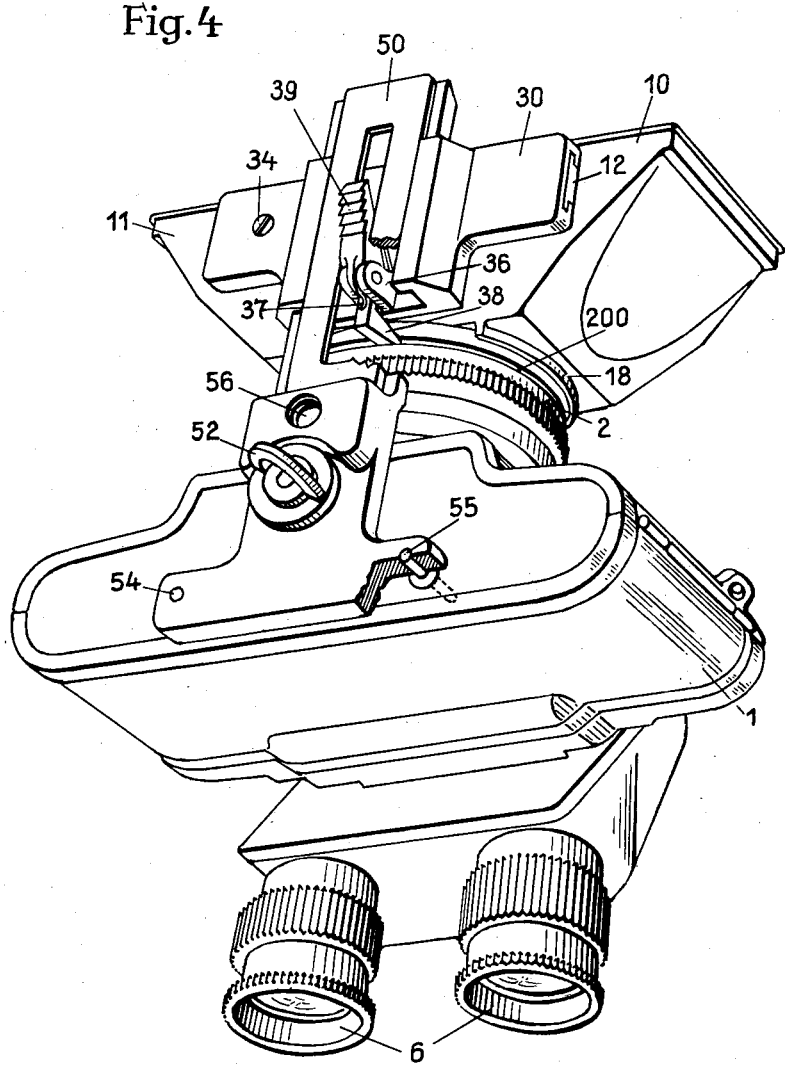
Fig. 4 is an underside perspective view of the stereoscopic camera shown in Figs. 2 and 3 and showing the details of the carrier and the mounting bracket securing the adaptor constructed in accordance with the present invention to the camera casing.
Figure 5:
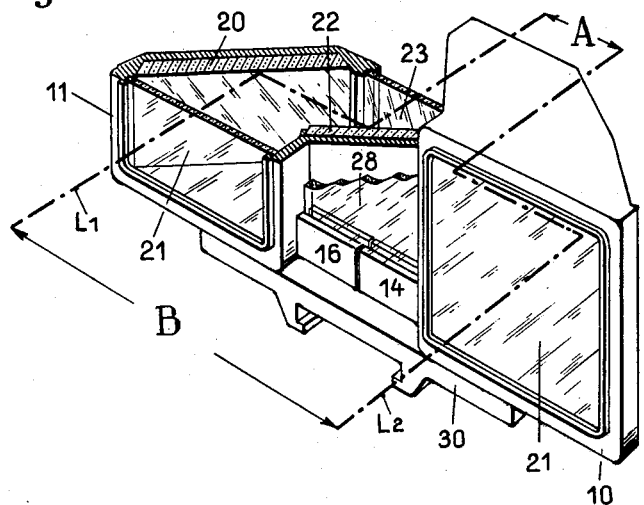
Fig. 5 is a perspective view of the adaptor of the present invention partially in cross-section showing one arrangement of the light ray directing members which comprise reflecting members.
Figure 6:
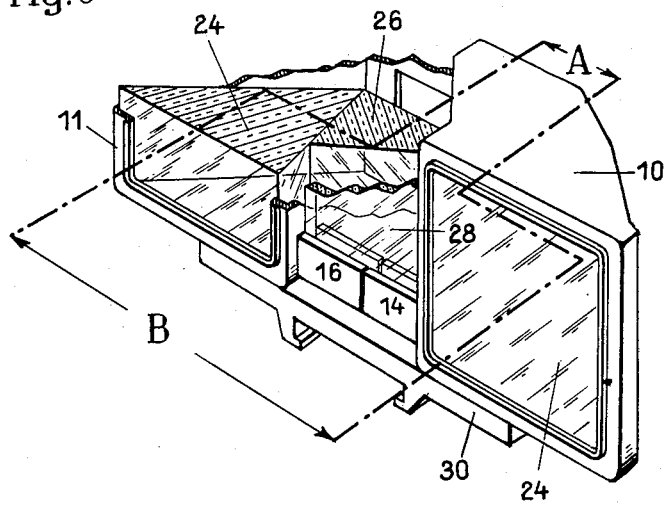
Fig. 6 is similar to Fig. 5 but showing a second embodiment in which the light ray directing members comprise prisms.

As shown in Figs. 2 and 4 the inter-pupillary distance adaptor of the present invention including the optical members for increasing the inter-pupillary distance of the camera is mounted in front of the lens mount 2 housing the two lenses 3 and 4. The optical members for enlarging inter-pupillary distance are located in the two housings 10 and 11, each of which are provided with a guiding bar 12 slidably seated within a guiding groove formed in a transverse carrier arm 30 such that the housings 10 and 11 may be moved relatively to each other transversely to the axes of the lenses 3 and 4. Mounted in each of the housings 10 and 11 are well known light ray directing members which may comprise a pair of mirror-like reflecting plates 20 and 22, as shown in Fig. 5, or a pair of prisms 24 and 26, as shown in Fig. 6. Both of these light ray directing systems serve to enlarge the inter-pupillary distance A shown in Fig. 1 by deflecting the light rays between the camera lenses and the object being photographed. To protect the reflecting members 20 and 22 of the embodiment shown in Fig. 5 there are provided protective transparent covering plates 21 and 23 which are secured within each of the housings 10 and 11. Since the optical members are well known and do not form a part of the present invention, a further description is not believed to be necessary.

The path of the light ray creating an inter-pupillary distance B as illustrated in Figs. 2, 5 and 6 is as follows:

The housings 10 and 11 are positioned such that the center lines of each are respectively equidistantly spaced from the axes of its associated lens 4 and 3. The light beams $L_1$ and $L_2$ respectively approaching the lenses 3 and 4, as shown for example in Fig. 5 pass through the protective plates 21 and strike the reflecting plates 20 which are arranged at an angle of less than 45° relatively to the axes of the lens 3 and 4. The light rays $L_1$ and $L_2$ are then reflected and strike the other reflecting plates 22 which are also inclined at an angle of less than 45° relatively to the lens axes, whereupon the light rays from each of reflecting plates 21 form a small inter-pupillary distance, namely the normal distance A, of the lenses 3 and 4 as shown in Fig. 1. A similar light ray path having the same optical effect is accomplished with the prism arrangements 24 and 26 shown in Fig. 6.

Figure 3:
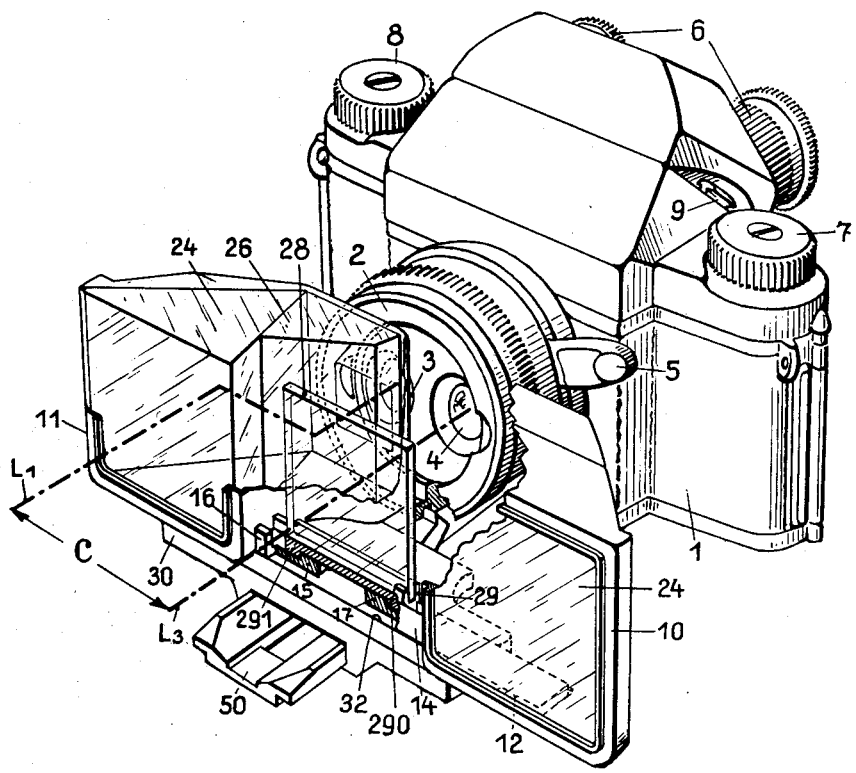
Fig. 3 is similar to Fig. 2 but showing the adaptor arranged to create a medium inter-pupillary distance C larger than the inter-pupillary distance A shown in Fig. 1 but smaller than the inter-pupillary distance B shown in Fig. 2.

In the event it is desired to alter the inter-pupillary distance to the distance C shown in Fig. 3, there is provided by the present invention an arrangement whereby one of the optical elements may be rendered ineffective when one of the housings 10 or 11 is moved laterally. Thus for example, if the housing 10 or 11 is shifted laterally the light ray $L_3$ originating from the object to be photographed is not deflected but approaches the lens in a straight line, while the light ray $L_1$ is deflected, in the manner above described, by the prisms 24 and 26 or reflectors 20 and 22. Those light rays which pass through the laterally shifted housing do not reach the lens 4.

As is well known, there is associated with the passage of light from a glass to air and vice versa from air to glass a loss of light intensity caused by absorption and reflection. Thus, in the event the ray $L_3$ reaches the lens 4 unhindered, there would result a distinguishable difference in the light intensity between the rays $L_3$ and $L_1$ of which the latter must penetrate glass and also be reflected. This would result in a difference in light intensity of the two overlapping stereoimages on the film. For the purpose of equalizing the light intensity of the light rays $L_1$ and $L_3$ when they reach the lenses 3 and 4 there is disposed between the housings 10 and 11 a filter 28 which serves to reduce the light intensity of the light ray $L_3$ such that it is equal in intensity to the light ray $L_1$ after the latter passes through the optical members in the housing 11.

When the inter-pupillary distance is changed from the distance B to C, as above described, by laterally shifting housing 10 there is provided by the present invention an arrangement for simultaneously shifting the filter 28 such that upon moving the housing 10 to its inoperative position the filter 28 is also moved and positioned such that the ray $L_3$ passes through the center thereof. To this end, there is provided on each of the housings 10 and 11, respectively, V-shaped channels 14 and 16 which are slidably seated within a guiding groove 32 formed in the carrier 30. The filter 28 has secured along its bottom edge a frame 29 which is slidably supported in the channel members 14 and 16. The frame 29 is formed along its bottom surface adjacent the ends thereof with downwardly projecting stopping bosses 290 and 291 which, as shown in Fig. 3, are adapted to cooperate with complementary upwardly extending stops 17 and 15 respectively, formed on the channel members 14 and 16 whereby when the housing 10 is laterally moved from its position shown in Fig. 2 the stop 290 engages the stop 17 and thereby also to slidably shift the filter 28 until the stops 15 and 291 are in engagement, whereupon the filter plate 28 is held fixed against further movement in its operative position. In order to hold the houisng 11 fast relatively to the carrier 30 the housing 11 is releasably secured thereto, as for example with a screw 34, as shown in Fig. 4.

The carrier 30 is slidably carried for movement toward and away from the lenses 3 and 4 on a support bracket 50 extending parallel to the lens axes. Turnably mounted on a lug 36 projecting from the lower surface of the carrier 30 is a spring urged locking detent 37 of which the nose 38 is adapted to be seated within a peripheral groove 200 formed in the lens mount 2 when the carrier 30 is located in its operative position relatively to the lenses 3 and 4 to obtain the inter-pupillary distances B and C. Hence, when the finger piece 39 is depressed the carrier 30 may be moved relatively to the support 50 and is not fixedly fastened to the camera as in the prior adaptors.

When the lenses 3 and 4 are focused the lens mount 2 is moved in the direction of the axes of the lenses 3 and 4, the carrier 30, since it is operatively coupled to the lens mount 2 by the spring detent 37, of which the nose 38 is seated in the mounting slot 200, is also moved thereby to retain the same spacing between the lenses 3 and 4 and the light ray directing members.

Figure 7:
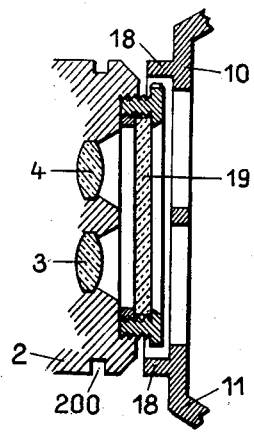
Fig. 7 is a horizontal cross sectional view taken along the center of the lens mounted and showing the relationship of the adaptor relatively to the lenses mount when the latter has an accessory mounted thereon.

In the event it is desired to attach a filter (see Fig. 7) on the lens mount 2, the inter-pupillary distance adaptor of the present invention is constructed such as not to interfere therewith. To this end, both of the housings 10 and 11 (Figs. 4 and 7) are formed with projecting flanges 18 which extend toward and are slightly spaced from the lens mount 2 to form a circular recess when the adaptor is located in its operative position above described. The recess defined by the circular flanges 18 is adequate to accommodate a color filter 19 for the lenses 3 and 4. It is also possible to attach other optical members in this recess, such as, for example, field of view adaptors, without interference from the inter-pupillary distance attachment.

The supporting bracket 50 upon which the inter-pupillary distance adaptor is slidably supported is detachably fastened on the underside of the camera. As is well known, cameras are usually provided with one or more threaded openings for attaching the camera to a tripod or the like and it is this threaded opening which receives the fastening element for securing the bracket 50 to the camera, as for example a threaded bolt 52 having pivoted finger piece. In order that bracket 50 be maintained in a precise parallel relationship with the axes of the lenses 3 and 4, locating pins 54 and 55 are provided on the camera casing which are received by complementary locating apertures formed in the bracket 50. Since the thread opening in the camera casing is utilized to attach the adaptor bracket 50 to the camera, there is provided in the bracket 50 a threaded opening 56 such that the camera, including the adaptor, may be supported on a tripod or the like.

As has been previously described, the stereoscopic camera is capable of taking stereoscopic photographs having an inter-pupillary distance A without using the adaptor. If it is desired to increase the inter-pupillary distance, as for example, B or C, the adaptor supported on the bracket 50 is fastened to the camera by the thumb screw 52. When it is desired to photograph with the normal inter-pupillary distance A of the lenses 3 and 4, according to the present invention, it is not necessary to detach the bracket 50 from the casing but it is merely required that the locking detent 37 be released such that the nose 38 is disengaged from the groove 200 whereupon the carrier 30 may be slidably removed from the bracket 50. It is also possible to photograph with the normal inter-pupillary distance A without removing the carrier 30. This is accomplished by releasing the screw 34 whereupon the housings 11 and 12 are no longer interlocked in the manner above described and both of the housings 10 and 11 can be slid laterally such that the light rays may pass uninterrupted directly to the lenses 3 and 4.

What we claim is:

1. An attachment for altering the inter-pupillary distance of a stereoscopic camera having a pair of lenses mounted within a common lens mount with a fixed spaced relationship comprising a support detachably secured to said camera and including a supporting bracket extending forwardly of said lenses and parallel with the axes thereof, a carrier extending transversely to said supporting bracket and being slidably mounted thereon for movement toward and away from said lenses, two light ray deflecting members slidably mounted on said carrier in laterally spaced relationship, said light ray members having a first position operatively associated with said lenses for creating an inter-pupillary distance wider than said normal inter-pupillary distance and a second position wherein only one of said light ray deflecting members is operative to deflect a light ray passing toward its associated lens for creating an inter-pupillary distance intermediate said wide and normal inter-pupillary distances, and a filter located between said light ray deflecting members, said filter being operative in said second position of said light ray deflecting members for diminishing the light intensity of the undeflected light ray.

2. An attachment for altering the normal inter-pupillary distance of a stereoscopic camera having a pair of lenses mounted in a fixed spaced relationship, comprising a support detachably secured to said camera, a plurality of optical means associated with said lenses for effecting an alteration in the inter-pupillary distance of said lenses, means mounting at least one of said optical means on said support for movement transversely to the axes of said lenses, said optical means comprising two laterally spaced light ray deflecting members one for each of said lenses, a filter disposed between said light ray deflecting members, one of said light ray deflecting optical members being mounted on said support for lateral movement relatively to said other light ray deflecting member to one position for directing a light ray to its associated lens and to a second inoperative position wherein it is ineffective to direct a light ray to its associated lens, said one light ray deflecting member in its one position forming with said other light ray deflecting member a wide inter-pupillary distance relatively to the normal fixed inter-pupillary distance of said lenses and in said second inoperative position said other light ray deflecting member forming with the lens from which said one light ray deflecting member has been moved out of operative light ray directing position a second inter-pupillary distance substantially intermediate said normal inter-pupillary distance of the lenses and said wide inter-pupillary distance, said light ray deflecting members being provided with spacing means for maintaining a fixed spacing therebetween when in said wide inter-pupillary distance, said light ray deflecting members further being provided with means for slidably supporting said filter between said light ray deflecting member and there being provided cooperating interlock means on said light ray deflecting members and said filter for moving said filter simultaneously with said one laterally movable light ray deflecting member and for positioning the center of said filter in alignment with the axis of the lens from which said one light ray deflecting member has been moved out of operative position.

References Cited in the file of this patent

UNITED STATES PATENTS

| | | |
|---|---|---|
| 2,413,996 | Ramsdell | Jan. 7, 1947 |
| 2,568,327 | Dudley | Sept. 18, 1951 |
| 2,753,774 | Norling | July 10, 1956 |